UNITED STATES PATENT OFFICE.

JOHN COLLINS CLANCY, OF PROVIDENCE, RHODE ISLAND, ASSIGNOR TO THE NITROGEN CORPORATION, OF PROVIDENCE, RHODE ISLAND, A CORPORATION OF RHODE ISLAND.

PROCESS OF GENERATING HYDROGEN AND HYDROGEN-NITROGEN MIXTURES.

1,425,579.     Specification of Letters Patent.     Patented Aug. 15, 1922.

No Drawing.     Application filed May 25, 1920.     Serial No. 384,170.

*To all whom it may concern:*

Be it known that I, JOHN COLLINS CLANCY, a subject of the King of Great Britain, residing at Providence, in the county of Providence and State of Rhode Island, have invented certain new and useful Improvements in Processes of Generating Hydrogen and Hydrogen-Nitrogen Mixtures, of which the following is a specification.

In a copending application Serial Number 380,003, filed May 8, 1920 I have described a process of preparing purified gas mixtures containing nitrogen and hydrogen, such mixtures being well adapted for use in connection with the known ammonia syntheses. The present invention is a modified procedure applicable to the preparation of such mixtures, and applicable also to the generation from hydrocarbons of substantially pure hydrogen. The invention depends upon the observation that iron-chromium alloys at high temperatures (of the general order of 1200-1300° C.) are extremely efficient catalysts for the reaction whereby hydrocarbons are converted by steam into a mixture of carbon monoxid and hydrogen. In the typical case of the decomposition of methane this reaction may be expressed by the following equation:

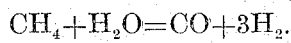

$$CH_4 + H_2O = CO + 3H_2.$$

The above reaction is known to occur in presence of iron oxid at elevated temperatures, but in such case temperatures of the maximum order contemplated herein cannot well be employed by reason of the tendency of the oxid to agglomerate or fuse. Ferrochromium, however, is refractory even at 1400° C. or upward, and is catalytically active at the high temperatures required for the rapid and complete performance of the above reaction.

Following is a preferred procedure in accordance with my invention as applied specifically to the preparation of gas mixtures containing nitrogen and hydrogen in approximate reacting proportions.

I first subject a suitable gas-oil to a cracking or decomposing operation in presence of sufficient air and steam to avoid any substantial separation of carbon. The decomposition is carried out at a high temperature, preferably about 1200-1300° C. in tubes or retorts of iron-chromium alloy or equivalent highly refractory material, the first retort at least being filled with irregular lumps or other form of packing consisting of ferrochromium. It is not necessary that any specific alloy should be used, although alloys containing around 10-70% of chromium have proven satisfactory in practice. The methane and other light hydrocarbons are by this treatment decomposed with substantial completeness into carbon monoxid and hydrogen, and a crude gas results which in the typical case may consist of volume percentages approximately as follows:

Hydrogen _____ 60 parts
Nitrogen _____ 20 parts
Carbon dioxid _____ 15 parts
Carbon monoxid _____ 5 parts This crude gas mixture is then passed at a decidedly lower temperature over an iron oxid catalyst in another tube or retort which may also consist of iron-chromium alloy. The temperature in this retort should not exceed 1000° C., above which temperature the reaction shows a tendency to reverse even in presence of the catalyst. The preferred temperature range is from 650 to 800° C., and a temperature approximating 750° C. fulfills all requirements for an almost complete conversion of the CO to $CO_2$. A small percentage of CO remains however in the gas mixture.

This residual carbon monoxid is now removed, preferably by passing the mixture at still lower temperatures, and mixed with sufficient air to bring about the oxidation of the carbon monoxid, over a catalyst capable of effecting the preferential combustion of carbon monoxid in presence of hydrogen. For such purpose I may use any suitable catalyst, a satisfactory material for the purpose being prepared by saturating pumice with a mixture of ferric nitrate and chormic acid in solution, and heating to drive off water and leave a residual deposit of the mixed oxids of iron and chromium. The material thus prepared is charged into iron pipes, heated to a suitable temperature which may be approximately 300° C., and the gas mixture containing sufficient air to bring about the preferential combustion of the residual carbon monoxid is passed through. The effluent gas will in the typical case under consideration contain approximately, by volume:

| Hydrogen | 60 parts |
|---|---|
| Nitrogen | 20 parts |
| $CO_2$ | 20 parts |

By removing the carbon dioxid in accordance with any known or approved method, for example by means of solutions of sodium carbonate, or preferably by means of aqueous ammonia as described in my copending application above referred to, a purified gas mixture containing approximately 75 parts by volume of hydrogen to 25 parts of nitrogen (the theoretical proportions for the ammonia synthesis) is obtained.

It will be understood, however, that the invention is not limited to the direct preparation of such definite gas mixtures, as the proportion of the gases in the resulting mixture may be subsequently adjusted as desired by the supply of nitrogen or of hydrogen as may be required; furthermore as above stated the process is directly applicable to the preparation of pure hydrogen, when steam and hydrocarbon vapors are admitted to the cracking retorts containing the ferrochromium.

I claim:—

1. Process of generating hydrogen from hydrocarbons, comprising passing a mixture containing a gaseous hydrocarbon and steam into contact with iron-chromium surfaces at a high temperature.

2. Process of preparing mixtures containing hydrogen and nitrogen, comprising passing a mixture containing a hydrocarbon vapor, steam and air into contact with iron-chromium surfaces at a high temperature.

3. Process of generating hydrogen from hydrocarbons, comprising passing a mixture containing a gaseous hydrocarbon and steam into contact with an iron-chromium alloy at a temperature of approximately 1200° C.

4. Process of generating hydrogen from hydrocarbons, comprising passing a mixture containing a gaseous hydrocarbon and steam into contact with an iron-chromium alloy at a high temperature and separating the resulting carbon compounds from the gaseous reaction products.

5. Process of generating hydrogen from hydrocarbons, comprising passing a mixture containing a gaseous hydrocarbon and steam into contact with an iron-chromium alloy at a temperature in the neighborhood of 1200–1300° C., oxidizing the carbon monoxid component of the gaseous reaction products, and separating the resulting carbon dioxid from the gaseous reaction products.

In testimony whereof, I affix my signature.

JOHN COLLINS CLANCY.